United States Patent
Luke et al.

[11] 3,841,669
[45] Oct. 15, 1974

[54] SWIVEL JOINTS FOR PIPES

[75] Inventors: William George Luke; David Pender Datson, both of Cornwall, England

[73] Assignee: English Clays Lovering Pochin & Company Limited, Cornwall, England

[22] Filed: June 14, 1973

[21] Appl. No.: 369,835

[30] Foreign Application Priority Data
June 14, 1972 Great Britain .................. 27888/72

[52] U.S. Cl. .............................................. 285/98
[51] Int. Cl. .............................................. F16l 17/00
[58] Field of Search ............ 285/98, 278, 279, 280, 285/281

[56] References Cited
UNITED STATES PATENTS
3,514,127 5/1970 Brooker .............................. 285/98
3,578,361 5/1971 Corrigan .............................. 285/98
3,776,578 12/1973 Jessup et al. .......................... 285/98

*Primary Examiner*—Patrick D. Lawson
*Attorney, Agent, or Firm*—Armstrong, Nikaido & Wegner

[57] ABSTRACT

Swivel joint for pipes, especially pipes containing liquid under high pressure. The joint includes bearing members in the form of annular rings of solid material, preferably of nylon plastics or asbestos reinforced plastics resin having a high compressive strength and low coefficient of friction, the bearing members being retained on a bush connected to one of the pipes and rotating relatively to a sleeve connected to the other pipe, the bearing members sustaining thrust in radial and both axial directions. The swivel joint may be used as a pivotal joint of a high-velocity, water-jet monitor.

13 Claims, 2 Drawing Figures

3,841,669

SWIVEL JOINTS FOR PIPES

BACKGROUND OF THE INVENTION

This invention relates to a swivel joint for pipes, which includes rotatable bearing surfaces for sustaining axial and radial thrust, and is particularly, although not exclusively, concerned with providing a rotatable joint for high-pressure water pipes, for example for pivoting the nozzle of a high-pressure, water-jet monitor.

SUMMARY OF THE INVENTION

According to the present invention, there is provided a swivel joint for pipes, comprising an annular sleeve integral with, or connectible to, the end of one of two pipes to be pivotally joined, an annular or part-annular bush adapted to be mounted on or integral with the end of the other pipe, the bush being arranged coaxially with the sleeve, one within the other, and having at least one recess with one or more annular or part-annular bearing members of a substantially solid bearing material located therein, and means for retaining the or each bearing member and the two pipes in their relative axial positions, the or each bearing member having bearing thrust faces for sustaining radial and axial thrust, which faces, in use, are arranged to bear against, and be capable of rotation relatively to, corresponding thrust faces associated with the sleeve, the bearing member or members being arranged so as to be capable of sustaining axial thrust in both axial directions.

In a preferred embodiment of the invention the annular or part-annular bush is located within the sleeve and has two recesses for accommodating two annular or part-annular bearing members which are axially spaced from each other, and the retaining means comprises a retaining ring abutting one of the bearing members and removably connected to the end of the sleeve. Each bearing member preferably has a radial thrust face and an axial thrust face, the axial thrust faces of the two bearing members respectively facing in opposite axial directions.

Conveniently, the two bearing members are of the same outside diameter and the sleeve has a cylindrical inner surface having a radially inwardly directed shoulder adjacent its axially inner end, one of the bearing members, when located in its recess, having its axial thrust face bearing against the shoulder and its radial thrust face bearing against the inner cylindrical surface of the sleeve; and the other bearing member having its radial thrust face bearing against the inner cylindrical surface of the sleeve and its axial thrust face bearing against a corresponding thrust face on the retaining ring connected to the end of the sleeve.

The bush may be integral with one of the pipes, but is preferably made as a separate part in the form of two substantially half-annular pieces which are mounted around and retained on the end of the associated pipe, or around a further sleeve which can be joined to the pipe, for example by welding. Each half of the annular bush thus has two axially spaced part-annular recesses for accommodating the bearing members. Because the bush can thus be made as a separate part, this facilitates manufacture of the joint in that the bush can be made of a suitable material, for example bronze, different from that of the pipes (which may for example be made of mild steel), and machined accurately to the required size of the bearing members. The two-piece bush also facilitates assembly of the joint.

The invention is particularly advantageous if the bearing members are made of a plastics or compound material having a low coefficient of friction under high load, good wear resistance and a high compressive strength and rigidity. For example, the bearing members may be made of a suitable synthetic nylon plastics for example Nylatron, or Ferobestos, a compound bearing material manufactured by J. W. Roberts Limited.

Where a swivel joint according to the invention is used for high-pressure water or other liquid pipes, it is preferable to provide a seal or seals to prevent liquid from inside the pipes leaking to the bearing members.

In a preferred embodiment there are two sealing rings disposed axially apart either side of an opening in the wall of the sleeve which communicates with a leakage passage through the wall of the sleeve. If, in use, the sealing ring nearer the adjacent ends of the pipes inside the joint is leaking, liquid will leak to the outside of the sleeve thereby indicating the leakage but the other sealing ring will, nevertheless, prevent liquid reaching the bearing members.

BRIEF DESCRIPTION OF THE DRAWINGS

The invention may be carried into practice in a number of ways, but one specific embodiment will now be described, by way of example, with reference to the accompanying drawings, in which.

DETAILED DESCRIPTION OF THE PREFERRED EMBODIMENT

Figure 1:
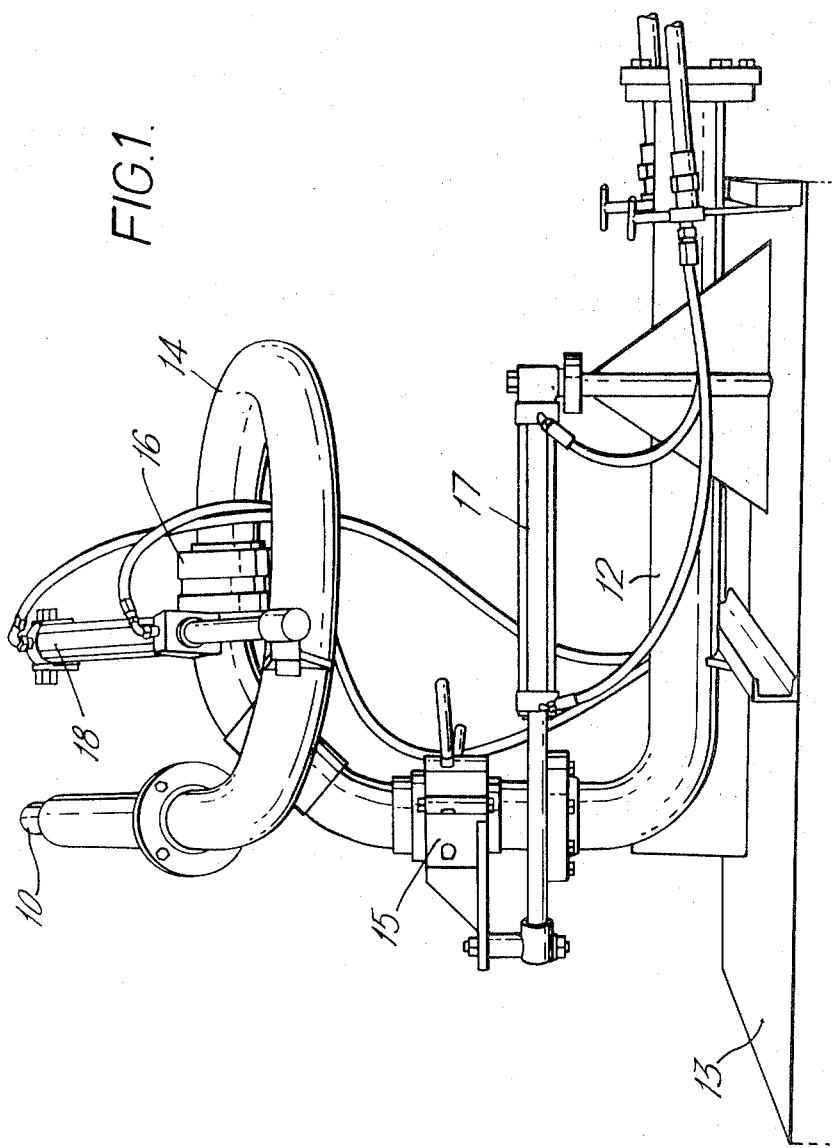
FIG. 1 is a view of a high-velocity water jet monitor having a nozzle which can be pivoted horizontally and vertically.

FIG. 1 of the drawings shows a high-pressure water jet monitor of the type used, for example, in the china-clay mining industry for washing clay from the earth by means of a high-velocity water jet which is directed at an area of the earth where the clay is to be washed out. The water jet issues from a nozzle 10 of the monitor, the water being supplied to the nozzle under high pressure through a supply pipe 12 which is secured to a base 13 and which is further arranged in the form of a loop or coil 14 for countering the reaction thrust of the jet.

The washing process takes place, over a period of time, by oscillating or pivoting the nozzle of the monitor continually back and forth over a selected area of the ground to be washed, and to this end, the supply pipe of the monitor, above the base, is provided with a first swivel joint 15 for pivoting the nozzle about a vertical axis, and a second swivel joint 16, situated at the beginning of the reaction loop 14 and connected to the first joint 15 by an elbow section so that its axis is perpendicular to that of the first swivel joint 15, for pivoting the nozzle 10 about a horizontal axis. Pivoting movement of the nozzle 10 is effected by means of hydraulically operated rams 17 and 18 the piston rods of which are connected respectively to one side of the joints 15 and 16 so that the nozzle 10, and hence the jet of water, can be moved in a horizontal or vertical direction or both, simultaneously, when the rams are operated. In practice these rams 17 and 18 are operated automatically for pivoting the nozzle in a preset programmed manner over a period of time.

Owing to the high pressure of water in the supply pipe, up to 500 pounds per square inch, which is required to produce the high-velocity jet of water, it will be appreciated that the swivel joints 15 and 16 must be well made and durable in order to operate efficiently, and continuously over long periods, under the particular conditions of high water pressure in the pipes and the continually changing thrust in both the radial and axial directions owing to the large reaction thrust of the jet and the pivoting movement both horizontally and vertically of the nozzle 10.

Figure 2:
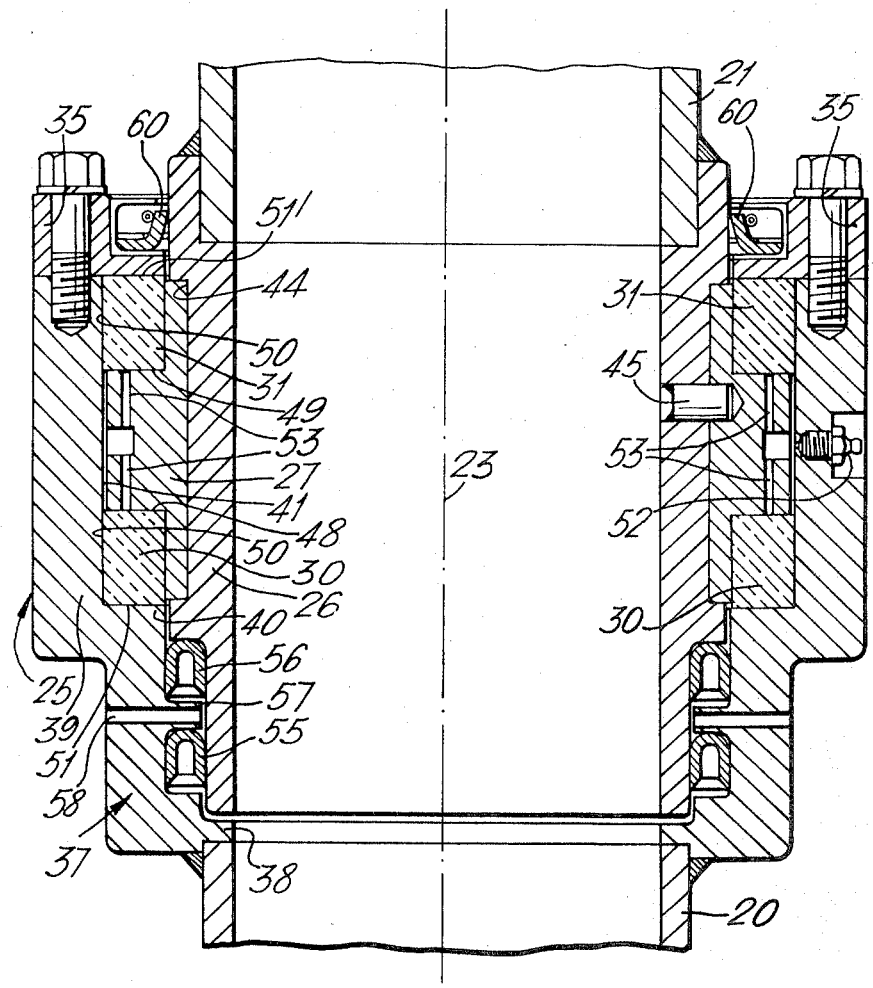
FIG. 2 is an axial section of a swivel joint, according to the invention, incorporated in the monitor of FIG. 1.

The swivel joints 15 and 16 are of substantially identical design and an axial section of one of the joints is shown in FIG. 2. The swivel joint is disposed in the supply pipe 12 and effectively joins two sections 20 and 21 of the pipe 2 so that one section, usually 21, is rotatable about an axis 23 relatively to the other.

The swivel joint comprises generally an outer sleeve 25 welded coaxially to the pipe section 20 and an inner sleeve 26 welded coaxially to the other pipe section 21, the inner sleeve having an annular bush 27 mounted thereon in which are located two annular bearing members 30, 31, the assembly being held together by a retaining ring 35 which is bolted to the end of the outer sleeve 25.

The outer sleeve 25 is of mild steel and has a first portion 37, adjacent the end connected to the pipe 20, having an inside diameter equal to the outside diameter of the pipe 20 with a radially inwardly directed flange 38 abutting the end of the pipe 20. The first portion 37 of the sleeve 25 is connected with a second enlarged diameter portion 39, by means of a shoulder 40, the inner surface 41 of the portion 39 being accurately machined to a cylindrical form which affords a radial thrust bearing surface for co-operating with the bearing members 30, 31, as will be explained.

The inner sleeve 26 is also of mild steel and has an inside diameter equal to the inside diameters of the pipes 20, 21 and is welded to the pipe 21 which is located in a recess in the thickened end wall of the sleeve adjacent the pipe 21. The sleeve 26 has an annular recess 44 in its outer surface extending over an axial length approximately equal to the length of the inside cylindrical surface of the enlarged diameter portion 39 of the outer sleeve 25, in which recess is located the bush 27 which is generally in the form of a cylinder divided into two halves along an axial plane thereby comprising two half-annular portions, and is made of bronze. The outside diameter of the bush 27 is slightly less than the inside diameter of the cylindrical surface 41, and each half of the bush is located on the inner sleeve 26 by means of dowels 45 retained and sealed, by welding, in radial holes in the sleeve 26 and which project into corresponding holes in the bush 27.

Each half of the bush 27 has two accurately machined annular recesses 48, 49 disposed respectively one adjacent each end in which are located the bearing members 30, 31 which are complete annular rings having a rectangular section and are made of a bearing material known as Ferobestos grade LA.33, manufactured by J. W. Roberts Limited. Ferobestos grade LA.33 is a reinforced plastics material moulded from asbestos impregnated with thermo-setting resin and incorporating flake graphite.

This material is very suitable for a high-pressure bearing since it has high strength and rigidity, good resistance to wear and, above all, a low coefficient of friction. Each bearing member 30, 31 has an outwardly facing radial thrust face 50 and an axially-facing thrust face 51, the axial thrust face 51 of the bearing member 30 bearing against the shoulder 40 of the outer sleeve 25 and the axial thrust face 51' of the bearing member 31 facing in the opposite axial direction and bearing against a thrust face on the inside of the retaining ring 35.

The bush 27 is provided with lubricating channels (not shown) along the inner surfaces of the recesses 48, 49 for lubricating the bearing members 30, 31 with grease which is applied via axially extending passages 53 in the bush 27 through a greasing nipple 52 provided in the outer sleeve 25.

Between the first portion 37 of the outer sleeve 25 and the adjacent end of the inner sleeve 26 there are provided two U-section sealing rings 55, 56 axially spaced apart either side of a radial flange 57 which has a leakage passage 58 formed therein extending through the wall of the sleeve portion 37. The faces of the sleeves 37 and 26 which define the spaces in which the seals 55, 56 are respectively located, are hard-chromeplated to provide good sealing surfaces for the sealing rings. A further seal 60 for preventing extraneous dirt from entering the bearings of the joint is provided at the other end of the joint, trapped in a recess formed between the retaining ring 35 and the wall of the inner sleeve 26.

The swivel joint is assembled as follows:

The sealing rings 55 and 56 are first placed in their respective positions inside the outer sleeve 25 which has been welded to the pipe section 20. The inner sleeve 26, welded to the pipe section 21, then has the bearing member 31 placed over it and the two halves of the bush 27 are then mounted in the recess 44 and located on the dowels 45. The two bearing members 30 and 31 are then positioned respectively in their corresponding recesses 48 and 49 in the bush, and the sleeve 26, together with the bush 27 and the bearing members 30, 31, is then inserted into the sleeve 25 so that end of the sleeve 26 fits inside the seals 55, 56 and the bearing member 30 rests against the axial thrust face 51 afforded by the shoulder 40. The retaining ring 35 (with its seal 60) is then bolted onto the end of the outer sleeve 25 so that it bears against the bearing member 31 and retains the pipe sections 20, 21 and the other parts of the joint assembly firmly in their relative axial positions.

An alternative way of assembling would be to position the bearing member 30 initially inside the outer sleeve 25, rather than on the bush 27, so that when the sleeve 26 together with the bush 27 is inserted into the sleeve 25 the recess 48 in the bush 27 engages the bearing member 30 and traps it in position.

Because of the low coefficient of friction between the bearing members 30, 31 and their corresponding thrust faces on the sleeve 25 the whole of the inner sleeve 26 and bush assembly is able to rotate freely about its axis 23. Radial thrust on the joint is sustained by the radial thrust faces 50 of the bearing members bearing against the inner cylindrical surface 41 and axial thrust in either axial direction is sustained by the axial thrust faces 51, 51' of the bearing members against the shoulder 40 or the thrust face on the inside of the retaining member 35.

The seals 55 and 56 serve to prevent the high-pressure water leaking from the inside of the pipes to the bearing members, the U-section sealing rings being so arranged to increase their sealing effect with increased pressure. If water seeps passed the first seal 55, this water will pass through the leakage passage 58 in the wall of the outer sleeve 25 thereby providing an indication to an operator that that seal is leaking, but water will not pass to the bearing members because of the other seal 56.

Once the swivel joint has been assembled and greased it can be operated under the high water pressure and thrust conditions without trouble over long periods. Because the Ferobestos bearing members are rigid the joint does not become distorted and damaged with use. In one test a swivel joint on a 6 inch bore water pipe was tested successfully up to a water pressure of 1,000 p.s.i.

It will be appreciated that the swivel joint according to the invention is simple in design and readily assembled and maintained. Hitherto it has been found necessary for designing high pressure pipe swivel joints to use complicated bearing arrangements incorporating rollers or ball bearings, which are bulky and complex. The present invention provides a swivel joint which is more efficient than such bearings and moreover is more compact and of less weight.

We claim:

1. A swivel joint for pipes, comprising an annular sleeve connectible to the end of one of two pipes to be pivotally joined, an annular bush adapted to be secured to the end of the other pipe, the bush being arranged coaxially with the sleeve, one within the other, and the bush affording at least one recess, at least one annular bearing member of a solid bearing material located in the recess, and means for retaining the bearing member and the two pipes in their relative axial positions, the bearing member having bearing thrust faces for sustaining radial and axial thrust, which faces bear rotatably against corresponding thrust faces of the sleeve, the bearing member being adapted to sustain axial thrust in both axial directions.

2. A swivel joint according to claim 1, wherein the annular bush is located within the sleeve and has two recesses for accommodating two annular bearing members which are axially spaced from each other.

3. A swivel joint according to claim 2, wherein the retaining means comprises a retaining ring abutting one of the bearing members and removably connected to the end of the sleeve.

4. A swivel joint according to claim 3, wherein each bearing member has a radial thrust face and an axial thrust face, the axial thrust faces of the two bearing members facing in opposite directions.

5. A swivel joint according to claim 4, wherein the two bearing members are of the same outside diameter and the sleeve has a cylindrical inner surface having a radially-inwardly directed shoulder adjacent its axially inner end, one of the bearing members having its axial thrust face bearing against the shoulder and its radial thrust face bearing against the inner cylindrical surface of the sleeve, and the other bearing member having its radial thrust face bearing against the inner cylindrical surface of the sleeve and its axial thrust face bearing against a corresponding thrust face on the retaining ring connected to the end of the sleeve.

6. A swivel joint for pipes, comprising an annular sleeve connectible to the end of one of two pipes to be pivotally joined, an annular bush adapted to be secured to the end of the other pipe, the bush being arranged coaxially within the sleeve, and the bush affording two recesses, two annular members of a solid bearing material, axially spaced apart from each other and located in the recesses, and means for retaining the bearing members and the two pipes in their relative axial positions, the bearing members having bearing thrust faces for sustaining radial and axial thrust, which bear rotatably against corresponding thrust faces of the sleeve, the bearing members being adapted to sustain axial thrust in both axial directions, and wherein the bush is in the form of two half-annular pieces which are mounted around and retained on a further sleeve joined to the associated pipe.

7. A swivel joint according to claim 6, wherein the bearing members are each in the form of a complete annular ring having a rectangular section.

8. A swivel joint according to claim 6, wherein the bearing members are made of a plastics material having a low coefficient of friction and a high compressive strength and rigidity.

9. A swivel joint according to claim 8, wherein the bearing members are made of asbestos material impregnated with plastics resin.

10. A swivel joint for pipes, comprising an annular sleeve connectible to the end of one of two pipes to be pivotally joined, and annular bush adapted to be secured to the end of the other pipe, the bush being arranged coaxially within the sleeve, and the bush affording two recesses, two annular members of a solid bearing material, axially spaced apart from each other and located in the recesses, and means for retaining the bearing members and the two pipes in their relative axial positions, the bearing members having bearing thrust faces for sustaining radial and axial thrust, which bear rotatably against corresponding thrust faces of the sleeve, the bearing members being adapted to sustain axial thrust in both axial directions, wherein seals are provided for preventing liquid leaking from inside the pipes to the bearing member or members.

11. A swivel joint according to claim 10, wherein two sealing rings are disposed axially apart either side of an opening in the wall of the sleeve which communicates with a leakage passage through the wall of the sleeve.

12. A high-pressure water pipe including a swivel joint for pipes, comprising an annular sleeve connectible to the end of one of two pipes to be pivotally joined, an annular bush adapted to be secured to the end of the other pipe, the bush being arranged coaxially within the sleeve, and the bush affording two recesses, two annular members of a solid bearing material, axially spaced apart from each other and located in ther recesses, and means for retaining the bearing members and the two pipes in their relative axial positions, the bearing members having bearing thrust faces for sustaining radial and axial thrust, which bear rotatably against corresponding thrust faces of the sleeve, the bearing members being adapted to sustain axial thrust in both axial directions, wherein seals are provided for preventing liquid leaking from inside the pipes to the bearing member or members.

13. A high-velocity water-jet monitor including a swivel joint for pipes, comprising an annular sleeve connectible to the end of one of two pipes to be pivotally joined, an annular bush adapted to be secured to the end of the other pipe, the bush being arranged coaxially within the sleeve, and the bush affording two recesses, two annular members of a solid bearing material, axially spaced apart from each other and located in the recesses, and means for retaining the bearing members and the two pipes in their relative axial positions, the bearing members having bearing thrust faces for sustaining radial and axial thrust, which bear rotatably against corresponding thrust faces of the sleeve, the bearing members being adapted to sustain axial thrust in both axial directions, wherein seals are provided for preventing liquid leaking from inside the pipes to the bearing member or members.

* * * * *

Disclaimer 3,841,669.—*William George Luke* and *David Pender Datson*, Cornwall, England. SWIVEL JOINTS FOR PIPES. Patent dated Oct. 15, 1974. Disclaimer filed Nov. 30, 1976, by the assignee, *English Clays Lovering Pochin & Company Limited*.

Hereby enters this disclaimer to claims 1–5 of said patent.

[*Official Gazette February 1, 1977.*]